United States Patent
Noda et al.

(10) Patent No.: US 7,437,228 B2
(45) Date of Patent: Oct. 14, 2008

(54) AUTOMATIC ADJUSTING APPARATUS FOR ADJUSTABLE EQUIPMENTS

(75) Inventors: Kohei Noda, Toyota (JP); Yoshikazu Kondoh, Kariya (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 406 days.

(21) Appl. No.: 10/995,293

(22) Filed: Nov. 24, 2004

(65) Prior Publication Data

US 2005/0131609 A1  Jun. 16, 2005

(30) Foreign Application Priority Data

Nov. 26, 2003  (JP) ............... 2003-396153

(51) Int. Cl.
*G06F 17/00* (2006.01)
*G05B 19/42* (2006.01)

(52) U.S. Cl. .................. 701/49; 701/36; 340/5.72; 340/5.64

(58) Field of Classification Search ............ 701/49; 340/5.72, 5.64; 307/9.1, 10.1
See application file for complete search history.

(56) References Cited

U.S. PATENT DOCUMENTS

| | | | |
|---|---|---|---|
| 4,451,887 A | | 5/1984 | Harada et al. |
| 4,727,302 A | * | 2/1988 | Mizuta et al. ............. 318/567 |
| 4,809,180 A | * | 2/1989 | Saitoh ...................... 701/49 |
| 4,811,226 A | | 3/1989 | Shinohara |
| 4,812,838 A | * | 3/1989 | Tashiro et al. ............ 340/3.42 |
| 4,833,614 A | * | 5/1989 | Saitoh et al. ............... 701/49 |
| 6,759,943 B2 | * | 7/2004 | Lucy et al. ............... 340/5.72 |
| 6,867,510 B2 | * | 3/2005 | Kramer et al. ............ 307/10.1 |
| 6,956,302 B2 | * | 10/2005 | O'Farrell et al. ........... 307/9.1 |

FOREIGN PATENT DOCUMENTS

| | | |
|---|---|---|
| DE | 199 28 951 A1 | 12/2000 |
| JP | 3147658 B2 | 11/1995 |
| JP | 2000-280863 A | 10/2000 |

* cited by examiner

*Primary Examiner*—Khoi H. Tran
*Assistant Examiner*—Ronnie Mancho
(74) *Attorney, Agent, or Firm*—Sughrue Mion, PLLC

(57) ABSTRACT

An automatic adjusting apparatus for coordinately adjusting positions of adjustable equipments of an automobile comprises a first switch manually operated to adjust a first position of one of the adjustable equipments; a first adjuster for adjusting the first position; a first control unit putting the first adjuster into operation based on the operation of the first switch; a second switch manually operated to adjust a second position another of the adjustable equipments; a second adjuster for adjusting the second position; and a second control unit putting the second adjuster into operation based on the operation of the second switch; wherein the second control unit coordinately puts the second adjuster into operation in connection with the adjusting operation of the first control unit when the second switch is operated within a predetermined past period until the first switch is operated.

16 Claims, 7 Drawing Sheets

Fig.1
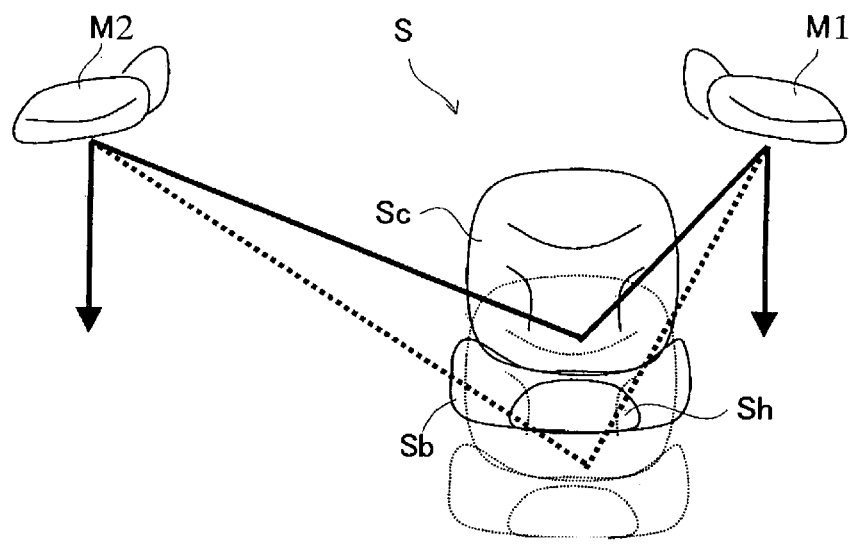
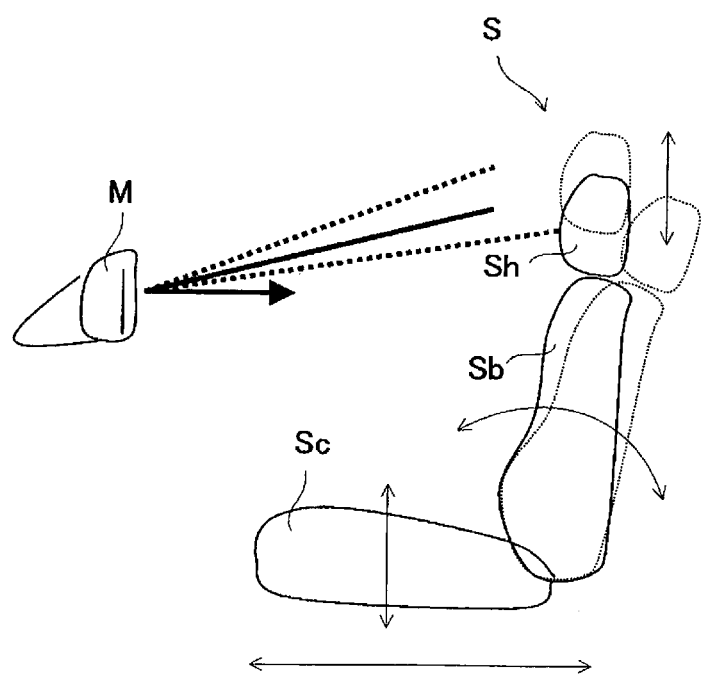

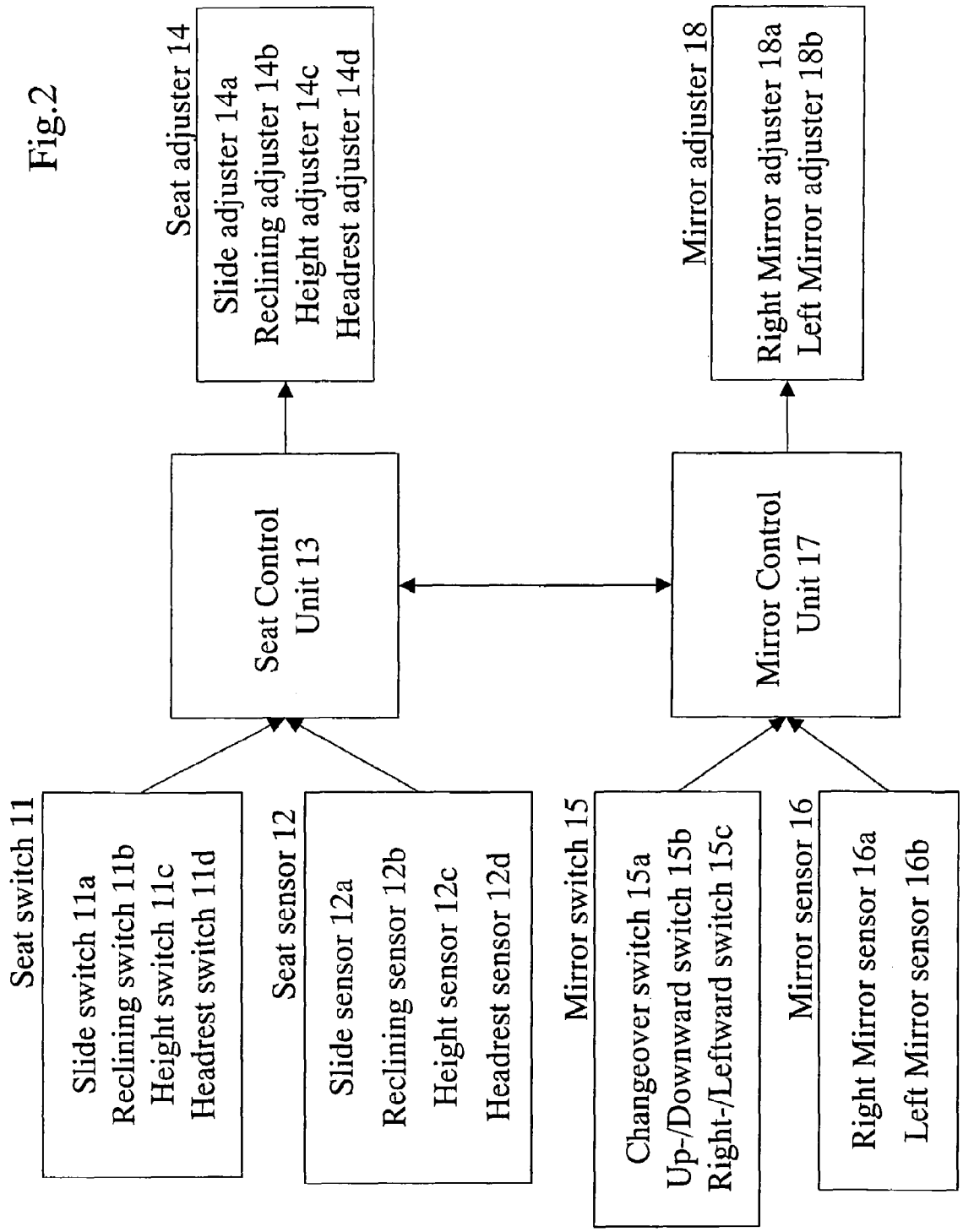

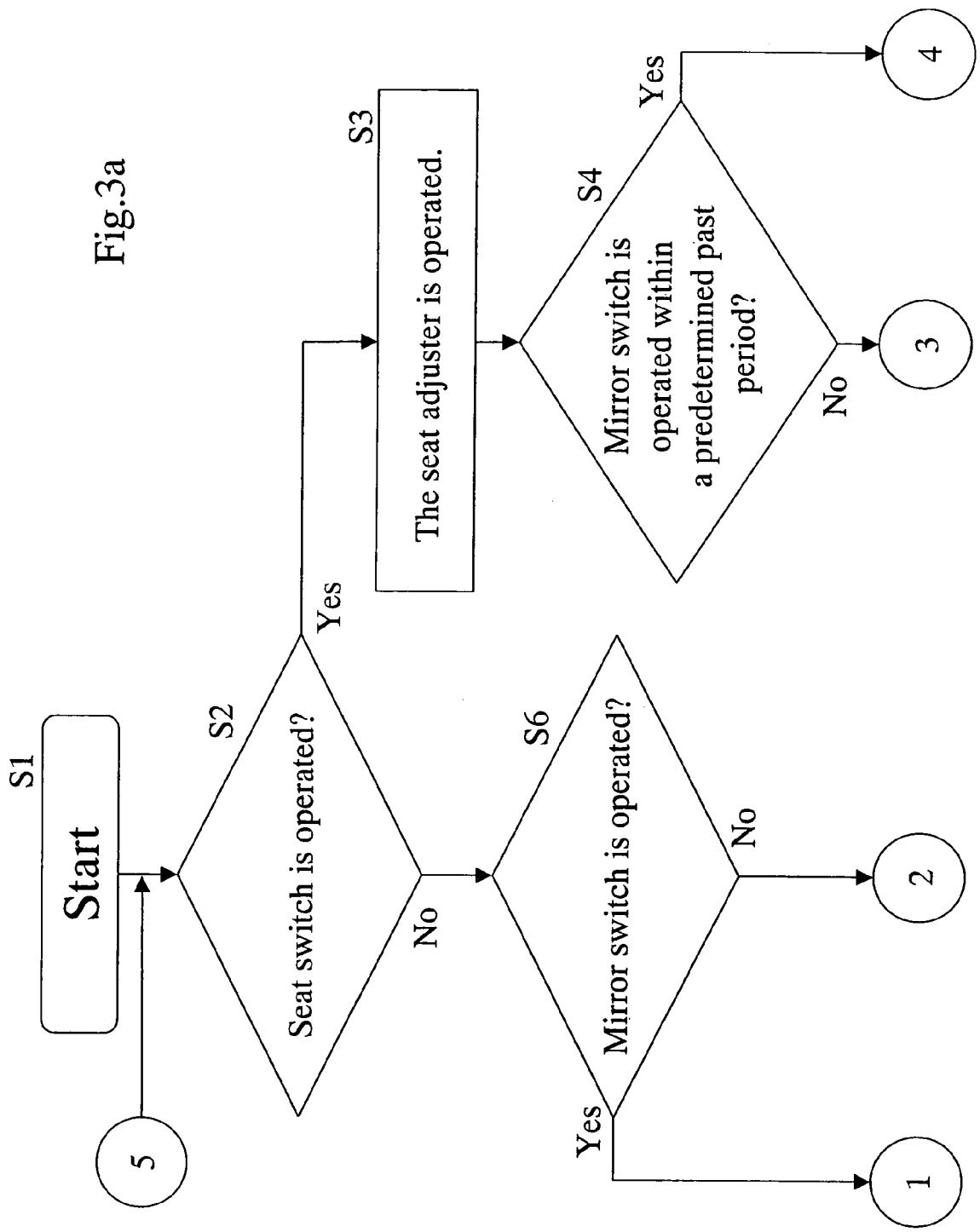

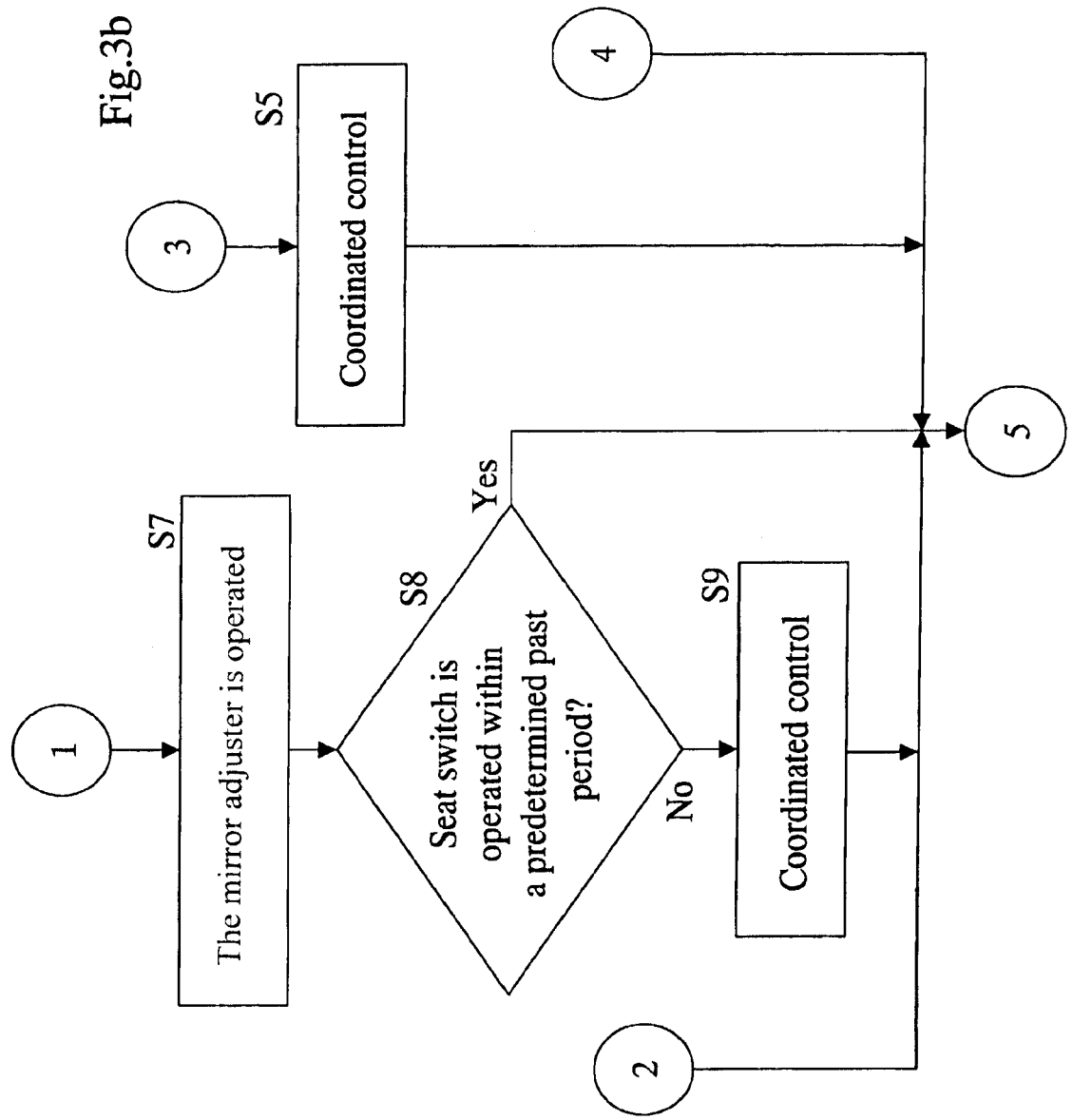

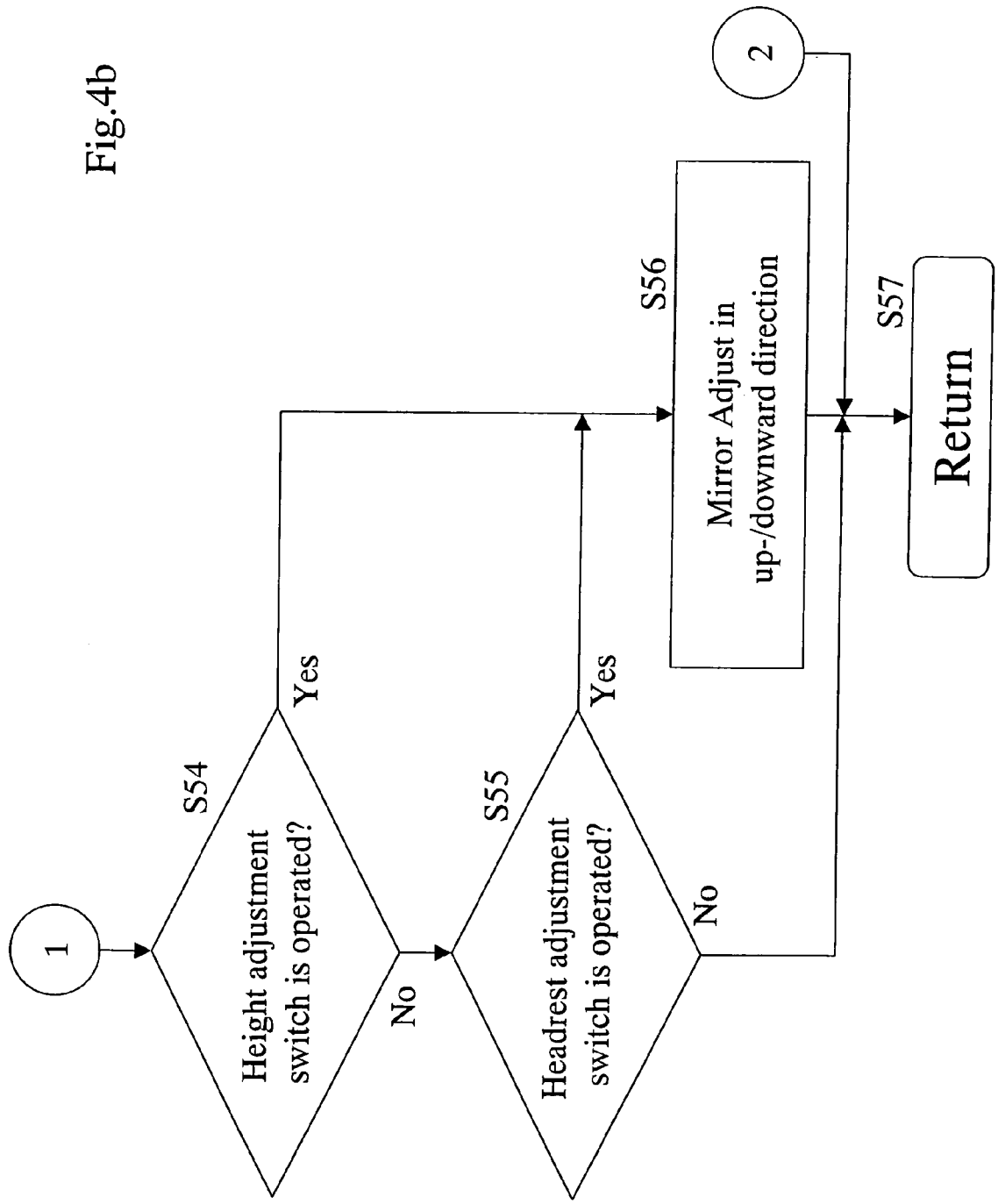

AUTOMATIC ADJUSTING APPARATUS FOR ADJUSTABLE EQUIPMENTS

CROSS REFERENCE TO RELATED APPLICATIONS

This application is based on and claims priority under 35 U.S.C. §119 with respect to Japanese Patent Application No. 2003-396153 filed on Nov. 26, 2003, the entire content of which is incorporated herein by reference.

FIELD OF THE INVENTION

The present invention relates to an automatic adjusting apparatus for adjustable equipments. More particularly, the present invention pertains to an automatic adjusting apparatus for adjusting height, sliding position, angle and/or direction of equipments in an automobile.

BACKGROUND

It is a recent demand in the automobile industry to improve not only fundamental and safety performance of the automobile but also convenience thereof. An automatic adjusting apparatus is provided for adjusting positions of adjustable equipments (eg. a seat, inside and outside rear view mirrors, a steering) around a driver.

According to the apparatus described in JP2000-280863A, once the positions of the adjustable equipments are memorized by the driver, the equipments are automatically adjusted or controlled without manual operation when the automobile recognize the driver who has an electrically identified key. Furthermore, the equipments are automatically adjusted or controlled upon riding on and getting off the automobile of the driver so that the driver easily rides in or gets off the automobile.

Indeed the driver usually benefits from the automatic adjusting apparatus, but the driver may manually adjust some of the positions of the adjustable equipments. When the driver manually adjusts the seat position, the mirror position should be also manually adjusted.

SUMMARY OF THE INVENTION

In light of the foregoing, the present invention provides an automatic adjusting apparatus for coordinately adjusting positions of adjustable equipments of an automobile comprising a first switch manually operated to adjust a first position of one of the adjustable equipments; a first adjuster for adjusting the first position; a first control unit putting the first adjuster into operation based on the operation of the first switch; a second switch manually operated to adjust a second position another of the adjustable equipments; a second adjuster for adjusting the second position; and a second control unit putting the second adjuster into operation based on the operation of the second switch; wherein the second control unit coordinately puts the second adjuster into operation in connection with the adjusting operation of the first control unit when the second switch is operated within a predetermined past period until the first switch is operated.

BRIEF DESCRIPTION OF THE DRAWINGS

The foregoing and additional features and characteristics of the present invention will become more apparent from the following detailed description when considered with reference to the accompanying drawings, wherein:

FIG. 1 is an overview of an automatic adjusting apparatus for adjustable equipments;

FIG. 2 is a block diagram of the automatic adjusting apparatus in electric construction;

FIGS. 3a and 3b are flowchart showing operation of automatic adjusting executed by seat and mirror control units;

FIGS. 4a and 4b are flowchart showing a coordinated control executed by the seat and mirror control units at the step S5 in FIGS. 3a and 3b.

DETAILED DESCRIPTION

Figure 4A:
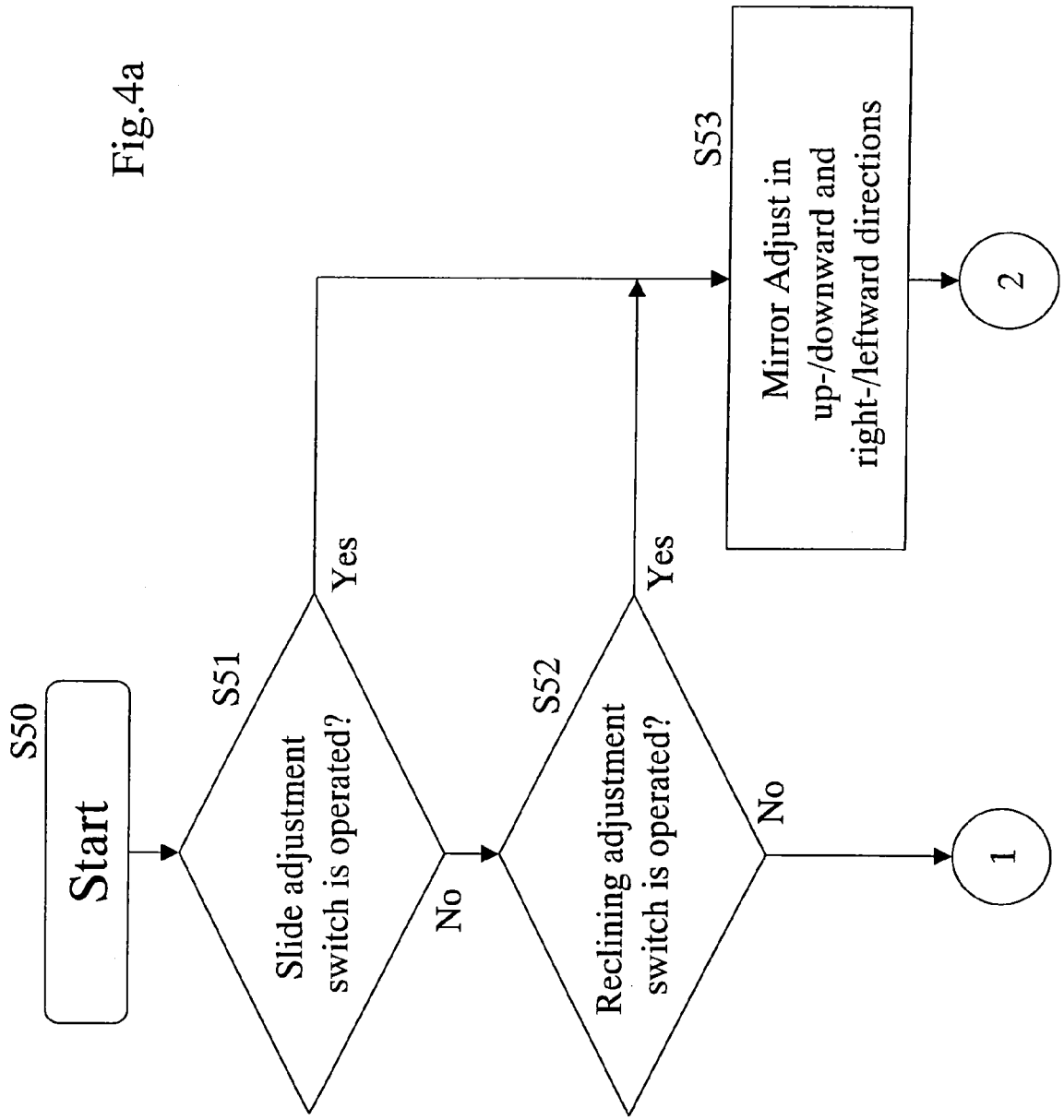

Embodiments of the present invention will be explained with reference to illustrations of the drawing figures as follows.

As shown in FIG. 1, an automatic adjusting apparatus 10 adjusts adjustable equipments of an automobile to improve convenience of driver and passengers of the automobile. The adjustable equipments are, for example, a seat, right and left outside mirrors (outside mirrors), an inside rear view mirror as well as a steering and so on. The apparatus 10 performs the following two kinds of controls. Firstly, an eye position of the driver is presumed based on seat position of the seat S, namely at least one of forward and backward sliding positions of a seat S, a reclining angle of a seat back Sb of the seat S, height of a seat cushion Sc of the Seat S and height of a headrest Sh of the seat S as well as a direction of a mirror. Each mirror face direction of both outside mirrors M1 and M2 is automatically and coordinately adjusted with the adjustment of the seat position in consideration of the presumed eye position. Secondly, an eye position of the driver is presumed based on the mirror face direction of both outside mirrors M1 and M2 in upward/downward direction. The presumed eye position represents a height of the headrest Sh so that the height of the headrest Sh is automatically and coordinately adjusted with the adjustment of the mirror face direction of both outside mirrors M1 and M2 in consideration of the presumed eye position.

When the seat S is slid in backward direction, an eye position of the driver tends to be relatively moved in backward and downward direction in connection with the former direction of the outside mirrors M1 and M2. Respective direction of both outside mirrors M1 and M2 is automatically adjusted in outward and downward direction according to the above adjusted seat position.

FIG. 2 shows a block diagram of the automatic adjusting apparatus 10 in electric construction. The apparatus 10 comprises a seat switch (a first switch) 11 manually operated to adjust the seat position of the seat S, a seat sensor 12, a seat control unit (a first control unit) 13 and a seat adjuster (a first adjuster) 14, in connection with the seat S as well as a mirror switch (a second switch) 15 manually operated to adjust the mirror face direction of the outside mirrors M1 and M2, a mirror sensor 16, a mirror control unit (a second control unit) 17 and a mirror adjuster (a second adjuster) 18, in connection with the outside mirrors M1 and M2.

The driver sitting on the seat S suitably adjusts seat position of the seat S with the seat switch 11 according to her/his own physique. The seat switch 11 includes a slide adjustment switch 11a for adjusting a front-/rearward position of the seat S, a reclining adjustment switch 11b for adjusting an reclining angle of the seat back Sb, a height (lift) adjustment switch 11c for adjusting a height of the seat cushion Sc and a headrest adjustment switch for adjusting a height of the headrest Sh.

The seat switch 11 is electrically connected with the seat control unit 13. The seat switch 11 provides the seat control unit 13 with each output signals of the switches 11a through 11d when the seat switch 11 is operated.

The seat sensor 12 detects the seat position of the seat S and includes a slide sensor 12a for detecting the front-/rearward position of the seat S, a reclining angle sensor 12b for detecting the reclining angle of the seat back Sb, a height (lift) sensor 12c for detecting the height of the seat cushion Sc and a headrest sensor 12d for detecting the height of the headrest Sh. The seat switch 12 is also electrically connected with the seat control unit 13. The seat sensor 12 provides the seat control unit 13 with each output signals of the sensors 12a through 12d when the seat position of the seat S is adjusted.

The seat control unit 13 comprises a conventional CPU (not shown), EEPROM (not shown), various memories (not shown) as well as software to carry out an operation of the automatic adjusting. The original or starting point that is necessary for adjusting the seat position of the seat S is memorized in the EEPROM. The software in the unit 13 carries out an operation to always recognize a seat position of the seat S within the adjustable range, based on the signals outputted from the sensors 12 through 12d and the original point.

The seat adjuster 14 is provided in well-known manner (eg. an electric motor, gears and shafts), and includes a slide adjuster 14a for adjusting the front-/rearward position of the seat S, a reclining adjuster 14b for adjusting the reclining angle of the seat back Sb, a height (lift) adjuster 14c for adjusting the height of the seat cushion Sc and a headrest adjuster 14d for adjusting the height of the headrest Sh. The seat adjuster 14 is electrically connected with the seat control unit 13. The seat control unit 13 puts the seat adjuster 14 into operation based on the output signals from the seat switch 11 and the seat sensor 12, so that the seat position of the seat S is appropriately adjusted.

The driver sitting on the seat S suitably adjusts each mirror face direction of the outside mirrors M1 and M2 with the mirror switch 15 according to her/his own eye position. The mirror switch 15 includes a changeover switch 15a for selecting one of the right and left outside mirrors M1 and M2 to be adjusted, an up-/downward adjustment switch 15b for adjusting each of the mirror face direction in up-/downwardly and an right-/leftward adjustment switch 15c for adjusting each of the mirror face direction in right-/leftwarly. The mirror switch 15 is electrically connected with the mirror control unit 17. The mirror switch 15 provides the mirror control unit 17 with each output signals of the switches 15a through 15c when the seat switch 15 is operated.

The mirror sensor 16 detects each of the mirror face direction of the outside mirrors M1 and M2 and includes a right mirror sensor 16a for detecting the mirror face direction of the right outside mirror M1 and a left mirror sensor 16b for detecting the mirror face direction of the left outside mirror M2. The mirror sensor 16 is also electrically connected with the mirror control unit 17. The mirror sensor 16 provides the mirror control unit 17 with each output signals of the sensors 16a and 16b when the mirror face direction of the outside mirrors M1 and M2 is adjusted. Each of the mirror face direction of the outside mirrors M1 and M2 is calculated in the mirror control unit 17 based on the signals of the mirror sensors 16a and 16b.

The mirror control unit 17 comprises a conventional CPU (not shown), EEPROM (not shown), various memories (not shown) as well as software to carry out an operation of the automatic adjusting. The mirror control unit 17 is electrically connected to the seat control unit 13 so as to achieve mutual information-communication (eg. Information exchange of seat position data and mirror face direction data).

The mirror adjuster 18 is provided in well-known manner (eg. an electric motor, gears and shafts), and includes a right mirror adjuster 18a for adjusting the up-/downward and right-/leftward position of the mirror face direction of the right outside mirror M and a left mirror adjuster 18b for adjusting the up-/downward and right-/leftward position of the mirror face direction of the left outside mirror M. The mirror adjuster 18 is electrically connected with the mirror control unit 17. The mirror control unit 17 puts the mirror adjuster 18 into operation based on the output signals from the mirror switch 15 and the mirror sensor 16, so that each of the mirror face direction of the outside mirrors M1 and M2 is appropriately adjusted.

Figure 5:
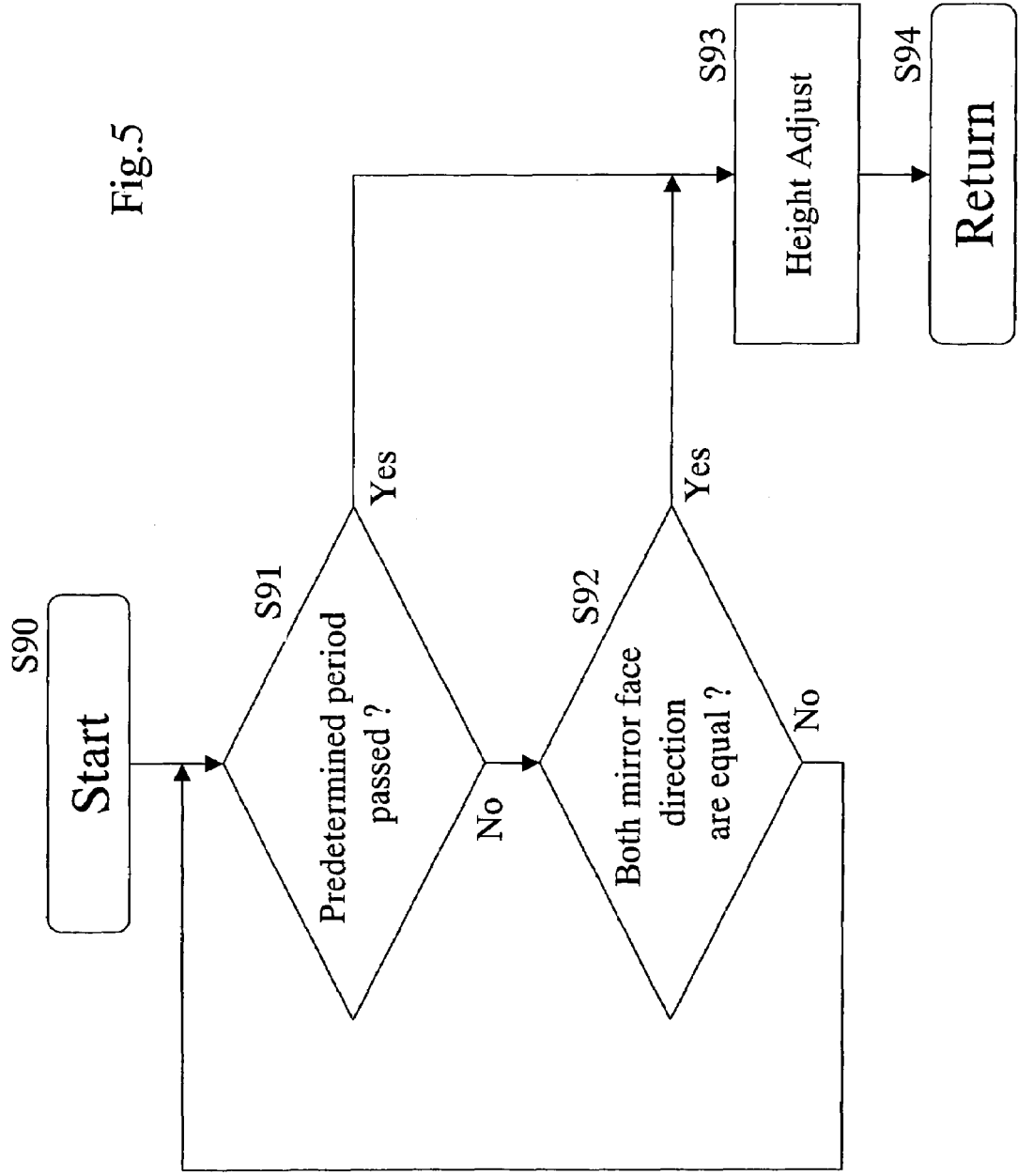
FIG. 5 is a flowchart showing another coordinated control executed by the seat and mirror control units at the step S9 in FIGS. 3a and 3b.

Referring to FIGS. 3 through 5, the operation of the automatic adjusting carried out by the software in the seat control unit 13 is described, as follows:

In FIGS. 3a and 3b, the operation of the automatic adjusting is executed at the step S1. Next, the seat control unit 13 judges at the step S2 whether a signal is inputted from the seat switch 11. Namely, the unit 13 judges at the step S2 whether the seat switch 11 is operated. When the judgment is affirmative at the step S2, the seat control unit 13 puts the seat adjuster 14 into operation based on the input signal, at the step S3. The seat position of the seat S is, therefore, appropriately adjusted.

Next, the seat control unit 13 judges at the step S4 whether a signal is inputted from the mirror switch 15 within a predetermined past period (eg. around 30 seconds) until the signal is inputted from the seat switch 11. Namely the unit 13 judges whether the mirror switch 15 is operated within a predetermined past period (eg. around 30 seconds) until the seat switch 11 is operated. When the judgment is negative at the step S4, the seat control unit 13 executes a coordinated control at the step S5.

Referring to FIGS. 4a and 4b, the coordinated control at the step S5 is described, as follows:

According to the coordinated control at the step S5, the mix or control unit 17 puts the mirror adjuster 18 into operation in connection with the adjusting operation at the step S3. More specifically the mirror control unit 17 judges which direction the mirror face direction of the outside mirrors M1 and M2 is adjusted in connection with the at least one of input signals from the slide adjustment switch 11a, the reclining adjustment switch 11b, the height (lift) adjustment switch 11c and the headrest adjustment switch 11d. Each of the mirror face direction of the outside mirrors M1 and M2 is, therefore, appropriately adjusted.

In FIGS. 4a and 4b, the coordinated control is executed at the step S50. At the step S51, the mirror control unit 17 judges whether the input signal at the step S1 is the signal from the slide adjustment switch 11a. Namely, the mirror control unit 17 judges whether the slide adjustment switch 11a is operated. When the judgment is negative at the step S51, the mirror control unit 17 judges at the step S52 whether the input signal at the step S1 is the signal from the reclining adjustment switch 11b. Namely, the mirror control unit 17 judges whether the reclining adjustment switch 11b is operated. When either the judgment at the step S51 or the judgment at the step S52 is affirmative, the mirror control unit 17 adjusts the up-/downward and right-/leftward positions of the mirror face direction of the outside mirrors M1 and M2 at the step S53.

The seat control unit 13 comprises a control map to arrange relative data between the seat position of the Seat S and each of the mirror face direction of the outside mirrors M1 and M2 within all adjustable range of them. The seat control unit 13 calculates each target mirror face direction of the outside mirrors M1 and M2 in connection with the adjusting operation at the step S3 according to the control map. The seat control unit 13 provides the minor control unit 17 with the target mirror face direction, so that the mirror control unit 17 puts the mirror adjuster 18 into operation based on the target mirror face direction. Namely, each of the right/left mirror adjuster 18a/18b is operated so as to up-/downwardly and right-/leftwardly adjust each of the mirror face direction of the outside mirrors M1 and M2. The adjusting operation at the step S53 is now completed and the coordinated control is terminated at the step S57.

When the judgment is negative at the step S52, the mirror control unit 17 judges at the step S54 whether the input signal at the step S1 is the signal from the height adjustment switch 11c. Namely, the mirror control unit 17 judges whether the height adjustment switch 11c is operated. When the judgment is negative at the step S54, the mirror control unit 17 judges at the step S55 whether the input signal at the step S1 is the signal from the headrest adjustment switch 11d. Namely, the mirror control unit 17 judges whether the headrest adjustment switch 11d is operated. When either the judgment at the step S54 or the judgment at the step S52 is affirmative, the mirror control unit 17 adjusts the up-/downward position of the mirror face direction of the outside mirrors M1 and M2 at the step S56.

The seat control unit 13 calculates each target mirror face direction of the outside mirrors M1 and M2 in connection with the adjusting operation at the step S3 according to the control map. The seat control unit 13 provides the mirror control unit 17 with the target mirror face direction, so that the mirror control unit 17 puts the mirror adjuster 18 into operation based on the target mirror face direction. Namely, each of the right/left mirror adjuster 18a/18b is operated so as to up-/downwardly adjust each of the mirror face direction of the outside mirrors M1 and M2. The adjusting operation at the step S53 is now completed and the coordinated control is terminated at the step S57.

When the judgment is negative at the step S55, the coordinated control is terminated at the step S57.

Referring to FIGS. 3a and 3b, when the judgment is affirmative at the step S4, the operation of the automatic adjusting also returns to the step S2. The mirror control unit 17 already puts the mirror adjuster 18 into operation independent of the adjusting operation at the step S3 in advance. When the coordinated control at the step S5 is terminated, the operation of the automatic adjusting returns to the step S2. On the latter occasion, when the seat switch 11 is furthermore operated within a predetermined period after the coordinated control at the step S5, the seat control unit 13 does not coordinately adjust the mirror face direction of the outside mirrors M1 and M2.

When the judgment is negative at the step S2, the seat control unit 13 judges at the step S6 whether a signal is inputted from the mirror switch 15. Namely, the unit 17 judges at the step S6 whether the mirror switch 15 is operated. When the judgment is affirmative at the step S6, the mirror control unit 17 puts the mirror adjuster 18 into operation based on the input signal, at the step S7. The mirror face direction of the outside mirrors M1 and M2 is, therefore, appropriately adjusted.

Next, the mirror control unit 17 judges at the step S8 whether a signal is inputted from the seat switch 11 within a predetermined past period (eg. around 30 seconds) until the signal is inputted from the mirror switch 15. Namely the unit 17 judges whether the seat switch 11 is operated within a predetermined past period (eg. around 30 seconds) until the mirror switch 15 is operated. When the judgment is negative at the step S8, the mirror control unit 17 executes a coordinated control at the step S9.

Referring to FIG. 5, the coordinated control at the step S9 is described, as follows:

According to the coordinated control at the step S9, the seat control unit 13 puts the seat adjuster 14 into operation in connection with the adjusting operation at the step S7. More specifically the seat control unit 13 puts the height adjuster 14d of the seat adjuster 14 into operation in connection with the up-/downward adjusting operation at the step S7. The height of the headrest is, therefore, appropriately adjusted.

In FIG. 5, the coordinated control is executed at the step S90. At the step S91, the mirror control unit 17 judges whether a predetermined period (eg. around 5 seconds) passed after the mirror face direction of one of the mirrors M, M was manually adjusted When the judgment is negative at the step S91, the mirror control unit 17 judges at the step S92 whether both of the outside mirrors M1 and M2 were manually and equally adjusted in up-/downward direction. Namely, the mirror control unit 17 judges at the step S92 whether the mirror face direction of the right outside mirror M1 is equal to the mirror face direction of the left outside mirror M2 in up-/downward direction. When either the judgment at the step S91 or the judgment at the step S92 is affirmative, the seat control unit 13 adjusts the height of the headrest at the step S93.

The mirror control unit 17 provides the seat control unit 13 with position data representing the adjusted mirror face direction of the outside mirrors M1 and M2 at the step S7. The seat control unit 13 calculates a target height of the headrest Sh in connection with the position data according to the control map. The seat control unit 13 puts the headrest adjuster 14d into operation based on the target height. The adjusting operation at the step S93 is now completed and the coordinated control is terminated at the step S94.

When the judgment is negative at the step S92, the operation of the coordinated control returns to the step S91.

When the judgment is affirmative at the step S8, the operation of the automatic adjusting also returns to the step S2. The seat control unit 13 already puts the seat adjuster 14 into operation independent of the adjusting operation at the step S7 in advance. When the coordinated control at the step S9 is terminated, the operation of the automatic adjusting returns to the step S2. On the latter occasion, when the mirror switch 15 is furthermore operated within a predetermined period after the coordinated control at the step S9, the mirror control unit 17 does not coordinately adjust the seat position of the seat S.

As described above, the seat control unit 13 and the mirror control unit 17 coordinately adjust both of the seat position of the seat S and the mirror face direction of the mirrors M, at the steps S3 and S5 (S53 and S56) as well as at the steps S7 and S9 (S93). It is, therefore, not necessary to manually adjust each of the seat position and the mirror face direction, separately. Namely, it prevents the driver from forgetting to adjust either the seat position or the minor face direction when one of them is manually adjusted. In addition, the automatic adjusting apparatus makes sure of an appropriate view for the driver so that more safety automobile is achieved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An adjusting apparatus for coordinately adjusting positions of a seat and an outside mirror of an automobile comprising:
   a seat switch manually operated to adjust a position of the seat;
   a seat adjuster for adjusting the position of the seat;
   a seat control unit putting the seat adjuster into operation based on the operation of the seat switch;
   a mirror switch manually operated to adjust a position of the outside mirror;
   a mirror adjuster for adjusting the position of the mirror; and
   a mirror control unit putting the mirror adjuster into operation based on the operation of the mirror switch;
   wherein one of the mirror control unit and the seat control unit is configured to coordinately put the corresponding adjuster into operation in connection with the adjusting operation of the other of the mirror control unit and the seat control unit.

2. The adjusting apparatus according to the claim 1, wherein
   the one of the mirror control unit and the seat control unit is configured to coordinately put the corresponding adjustor into operation in connection with the adjusting operation of the other of the mirror control unit and the seat control unit when the switch corresponding to the one of the mirror control unit and the seat control unit is not operated within a predetermined past period until the switch corresponding the other mirror control unit and the seat control unit is operated.

3. The adjusting apparatus according to the claim 1, wherein
   the mirror control unit is configured to coordinately put the mirror adjustor into operation in connection with the adjusting operation of the seat control unit when the mirror switch is not manually operated.

4. The adjusting apparatus according to the claim 1, wherein
   the seat control unit is configured to coordinately put the seat adjuster into operation in connection with the adjusting operation of the mirror control unit when the seat switch is not manually operated.

5. The adjusting apparatus according to the claim 3, wherein
   the seat control unit is configured to coordinately put the seat adjuster into operation in connection with the adjusting operation of the mirror control unit when the seat switch is not manually operated.

6. The adjusting apparatus according to the claim 1, wherein
   the mirror adjuster is configured to adjust a mirror face direction of the outside mirror as a rear-view mirror.

7. The adjusting apparatus according to the claim 6, wherein
   the seat switch includes at least one of a slide adjustment switch for adjusting a front-/rearward position of the seat, a reclining adjustment switch for adjusting an reclining angle of a seat back of the seat, a height adjustment switch for adjusting a height of a seat cushion of the seat and a headrest adjustment switch for adjusting a height of a headrest of the seat.

8. The adjusting apparatus according to the claim 7, wherein
   the mirror control unit is configured to adjust the up-/downward and right-/leftward positions of the mirror face direction of the rear view mirror when either the slide adjustment switch or the reclining adjustment switch is operated.

9. The adjusting apparatus according to the claim 7, wherein
   the mirror control unit is configured to adjust the up-/downward position of the mirror face direction of the rear view mirror when either the height adjustment switch or the headrest adjustment switch is operated.

10. The adjusting apparatus according to the claim 6, wherein
    the seat control unit is configured to adjust the height of the headrest when either a predetermined period passed after the mirror face direction of one of the mirrors was manually adjusted or both of the rear-view mirrors were equally adjusted in up-/downward direction.

11. The adjusting apparatus according to the claim 1,
    wherein the mirror control unit is electrically connected to the seat control unit to achieve mutual information communication.

12. An adjusting apparatus for coordinately adjusting positions of a seat and an outside mirror of an automobile comprising:
    a seat switch manually operated to adjust a position of the seat;
    a seat adjuster for adjusting the position of the seat:
    a seat control unit putting the seat adjuster into operation based on the operation of the seat switch:
    a mirror switch manually operated to adjust a position of the outside mirror:
    a mirror adjuster for adjusting the position of the mirror; and
    a mirror control unit putting the mirror adjuster into operation based on the operation of the mirror switch;
    wherein the mirror control unit is configured to coordinately put the mirror adjuster into operation in conjunction with the adjusting operation of the seat control unit when the mirror switch is not manually operated.

13. The adjusting apparatus according to the claim 12, wherein the seat switch includes at least one of a slide adjustment switch for adjusting a front-/rearward position of the seat, a reclining adjustment switch for adjusting a reclining angle of a seat back of the seat, a height adjustment switch for adjusting a height of a seat cushion of the seat and a headrest adjustment switch for adjusting a height of a headrest of the seat, and the mirror control unit is configured to coordinately put the mirror adjuster into operation in conjunction with the manual operation of at least one of the slide adjustment switch, the reclining adjustment switch, the height adjustment switch and the headrest adjustment switch.

14. The adjusting apparatus according to the claim 12, further including a seat sensor detecting the position of the seat and providing the seat control unit with the detecting signal when the position of the seat is adjusted by the seat adjuster, and wherein the mirror control unit is electrically connected to the seat control unit to receive information on the position of the seat provided by the seat sensor.

15. The adjusting apparatus according to the claim 12, wherein the mirror control unit is electrically connected to the seat control unit to achieve mutual information communication.

16. An adjusting apparatus for coordinately adjusting positions of a seat and an outside mirror of an automobile comprising:
- a seat switch manually operated to adjust a position of the seat;
- a seat adjuster for adjusting the position of the seat in response to a manual operation of the seat switch;
- a mirror switch manually operated to adjust a position of the outside mirror;
- a mirror adjuster for adjusting the position of the mirror in response to a manual operation of the mirror switch; and
- a control unit configured to coordinately put the mirror adjuster into operation in connection with the manual operation of the seat switch when the mirror switch is not manually operated.

* * * * *